US009483081B2

(12) United States Patent
Lee et al.

(10) Patent No.: US 9,483,081 B2
(45) Date of Patent: Nov. 1, 2016

(54) MOBILE TERMINAL

(71) Applicant: LG ELECTRONICS INC., Seoul (KR)

(72) Inventors: Minjong Lee, Seoul (KR); Jaehyuk Seol, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/662,782

(22) Filed: Mar. 19, 2015

(65) Prior Publication Data

US 2016/0070303 A1    Mar. 10, 2016

(30) Foreign Application Priority Data

Sep. 4, 2014    (KR) .................. 10-2014-0117906

(51) Int. Cl.
*G06F 1/16* (2006.01)
*H04M 1/02* (2006.01)

(52) U.S. Cl.
CPC ........... *G06F 1/1652* (2013.01); *G06F 1/1616* (2013.01); *H04M 1/0216* (2013.01); *H04M 1/0268* (2013.01)

(58) Field of Classification Search
CPC .. H05K 1/028; H05K 5/0017; H05K 5/0021; H05K 5/0226; G06F 1/1616; H04M 1/0216; H04M 1/0268
USPC .............. 361/79.01, 679.02, 679.04–679.09, 361/679.26–679.3, 679.55, 679.59; 455/575.1–575.9; 345/156, 157, 168, 345/169
See application file for complete search history.

(56) References Cited

U.S. PATENT DOCUMENTS

| | | | |
|---|---|---|---|
| 8,228,667 B2* | 7/2012 | Ma ........................ | G06F 1/1652 361/679.01 |
| 8,385,055 B2* | 2/2013 | Kao ...................... | G06F 1/1616 349/56 |
| 2012/0002360 A1* | 1/2012 | Seo ....................... | G06F 1/1616 361/679.01 |

(Continued)

FOREIGN PATENT DOCUMENTS

| | | |
|---|---|---|
| EP | 2403222 | 1/2012 |
| WO | 2014/087951 | 6/2014 |

OTHER PUBLICATIONS

European Patent Office Application Serial No. 15171809.5, Search Report dated Nov. 17, 2015, 8 pages.

*Primary Examiner* — Courtney Smith
*Assistant Examiner* — Sagar Shrestha
(74) *Attorney, Agent, or Firm* — Lee Hong Degerman Kang & Waimey

(57) ABSTRACT

A mobile terminal includes a flexible display unit configured to be deformed from a first state as an unfolded state to a second state as a folded state or from the second state to the first state, a first body unit configured to support one region of the display unit, a second body unit rotatably connected to the first body unit, configured to support the other remaining region of the display unit, and configured to become away from the first body unit while the flexible display unit is being changed from the second state to the first state, and a hinge unit configured to rotatably connect the first and second body units.

18 Claims, 13 Drawing Sheets

(56) References Cited

U.S. PATENT DOCUMENTS

| | | | | |
|---|---|---|---|---|
| 2012/0243206 A1* | 9/2012 | Wang | G09F 9/30 | 362/97.1 |
| 2012/0243207 A1* | 9/2012 | Wang | G09F 9/301 | 362/97.1 |
| 2012/0314399 A1 | 12/2012 | Bohn et al. | | |
| 2013/0010405 A1* | 1/2013 | Rothkopf | H04M 1/0216 | 361/679.01 |
| 2013/0194741 A1* | 8/2013 | Uchiyama | G06F 1/1681 | 361/679.26 |
| 2014/0042293 A1* | 2/2014 | Mok | G06F 1/1652 | 248/682 |
| 2014/0111954 A1* | 4/2014 | Lee | G06F 1/1641 | 361/749 |
| 2014/0126121 A1* | 5/2014 | Griffin | H04M 1/0216 | 361/679.01 |
| 2014/0126133 A1* | 5/2014 | Griffin | G06F 1/1652 | 361/679.27 |
| 2014/0355195 A1* | 12/2014 | Kee | G06F 1/1616 | 361/679.27 |
| 2015/0055287 A1* | 2/2015 | Seo | G06F 1/1652 | 361/679.27 |
| 2015/0077917 A1* | 3/2015 | Song | G06F 1/1681 | 361/679.27 |
| 2015/0241925 A1* | 8/2015 | Seo | G06F 1/1652 | 361/679.27 |

* cited by examiner

MOBILE TERMINAL

CROSS-REFERENCE TO RELATED APPLICATION

Pursuant to 35 U.S.C. §119(a), this application claims the benefit of earlier filing date and right of priority to Korean Application No. 10-2014-0117906, filed on Sep. 4, 2014, the contents of which are incorporated by reference herein in their entirety.

BACKGROUND OF THE INVENTION

1. Field of the Invention

The present disclosure relates to a mobile terminal having a display unit that can be deformed by an external force.

2. Background of the Invention

In general, a terminal may be classified into a mobile (portable) terminal and a stationary terminal according to a moveable state. The mobile terminal may be also classified into a handheld terminal and a vehicle mount terminal according to a user's carriage method.

As functions of the terminal become more diversified, the terminal can support more complicated functions such as capturing images or video, reproducing music or video files, playing games, receiving broadcast signals, and the like. By comprehensively and collectively implementing such functions, the mobile terminal may be embodied in the form of a multimedia player or a device. Efforts are ongoing to support and increase the functionality of mobile terminals. Such efforts include software and hardware improvements, as well as changes and improvements in the structural components.

Recently, mobile terminals including a flexible display that can be deformed by external force have been developed. In this case, however, if a flexible display unit is deformed to be folded or unfolded by using a hinge unit, the flexible display unit may be creased, degrading quality.

SUMMARY OF THE INVENTION

Therefore, an aspect of the detailed description is to provide a structure in which a flexible display unit is maintained to be flat while a mobile terminal is being deformed.

To achieve these and other advantages and in accordance with the purpose of this specification, as embodied and broadly described herein, a mobile terminal may include: a flexible display unit configured to be deformed from a first state as an unfolded state to a second state as a folded state or from the second state to the first state; a first body unit configured to support one region of the display unit; a second body unit rotatably connected to the first body unit, configured to support the other remaining region of the display unit, and configured to become away from the first body unit while the flexible display unit is being changed from the second state to the first state; and a hinge unit configured to rotatably connect the first and second body units.

In an example related to the present disclosure, the second body unit may include: a first plate rotatably mounted on the first body unit; and a second plate connected to the first plate so as to be slidably moved in a direction away from the first body unit when the display unit is being changed from the second state to the first state.

In an example related to the present disclosure, the first body unit may include a receiving space formed to be recessed on one surface of the first body unit to receive the second body unit and the other region of the flexible display unit in the second state.

In an example related to the present disclosure, the mobile terminal may further include an elastic unit configured to provide elastic force to move the second plate in the second state. Accordingly, the flexible display unit may be maintained in a more flat state in the first state, whereby output quality can be enhanced and damage to the flexible display unit due to a change in state of the flexible display unit can be minimized.

In an example related to the present disclosure, the mobile terminal may further include: connection units configured to connect the hinge unit and the first and second body units and elastic units provided to elastically support the connection units and the first and second body units.

In an example related to the present disclosure, the flexible display unit may include guide protrusions protruding from one surface of the flexible display unit and the first and second body units may include guide grooves allowing the guide protrusions to be inserted thereinto and extending in the one direction.

According to an exemplary embodiment of the present disclosure, in the mobile terminal having a flexible display unit formed to be folded with respect to the hinge unit, the flexible display unit may be maintained in an overall flat state by first and second plates that may be relatively movable by one region of the flexible display unit covering the hinge unit in the folded state.

Thus, even though the flexible display unit is deformed to be repeatedly unfolded or folded, damage to the folded region of the flexible display unit may be minimized. Also, quality of an image output to the folded region can be enhanced.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings.

DETAILED DESCRIPTION OF THE INVENTION

Figure 1:
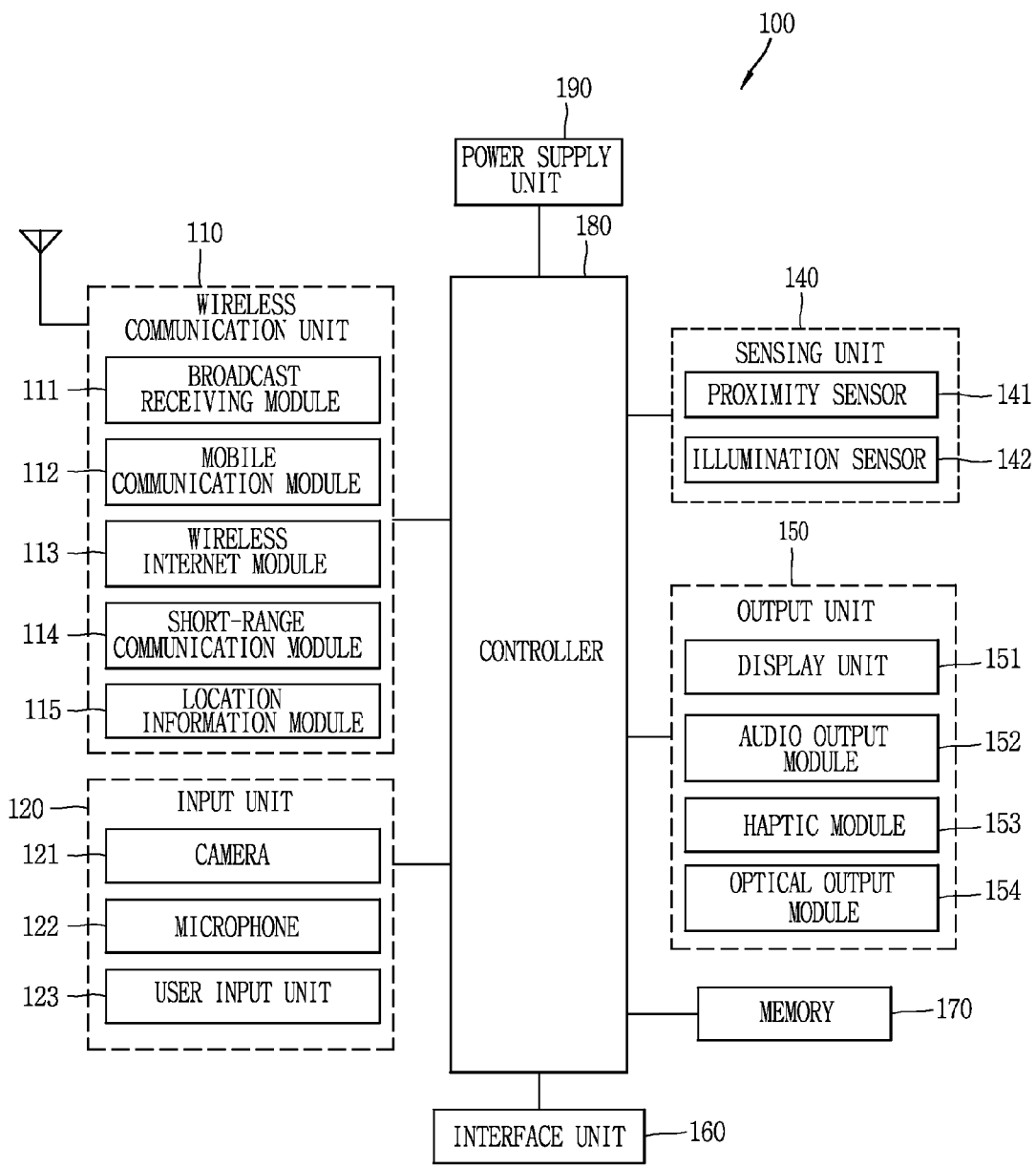
FIG. 1 is a block diagram illustrating a mobile terminal according to an exemplary embodiment of the present disclosure.

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

FIG. 1 is a block diagram of a mobile terminal in accordance with the present disclosure.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server.

Further, the wireless communication unit 110 typically includes one or more modules which connect the mobile terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1, the sensing unit 140 is shown having a proximity sensor 141 and an illumination sensor 142. If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154.

The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the various components depicted in FIG. 1, or activating application programs stored in the memory 170. As one example, the controller 180 controls some or all of the components illustrated in FIG. 1 according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

At least some of the above components may operate in a cooperating manner, so as to implement an operation or a control method of a glass type terminal according to various embodiments to be explained later. The operation or the control method of the glass type terminal may be implemented on the glass type terminal by driving at least one application program stored in the memory 170.

Referring still to FIG. 1, various components depicted in this figure will now be described in more detail.

Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The broadcast managing entity may be implemented using a server or system which generates and transmits a broadcast signal and/or broadcast associated information, or a server which receives a pre-generated broadcast signal and/or broadcast associated information, and sends such items to the mobile terminal. The broadcast signal may be implemented using any of a TV broadcast signal, a radio broadcast signal, a data broadcast signal, and combinations thereof, among others. The broadcast signal in some cases may further include a data broadcast signal combined with a TV or radio broadcast signal.

The broadcast signal may be encoded according to any of a variety of technical standards or broadcasting methods (for example, International Organization for Standardization (ISO), International Electrotechnical Commission (IEC), Digital Video Broadcast (DVB), Advanced Television Systems Committee (ATSC), and the like) for transmission and reception of digital broadcast signals. The broadcast receiving module 111 can receive the digital broadcast signals using a method appropriate for the transmission method utilized.

Examples of broadcast associated information may include information associated with a broadcast channel, a broadcast program, a broadcast event, a broadcast service provider, or the like. The broadcast associated information may also be provided via a mobile communication network, and in this case, received by the mobile communication module 112.

The broadcast associated information may be implemented in various formats. For instance, broadcast associated information may include an Electronic Program Guide (EPG) of Digital Multimedia Broadcasting (DMB), an Electronic Service Guide (ESG) of Digital Video Broadcast-Handheld (DVB-H), and the like. Broadcast signals and/or broadcast associated information received via the broadcast receiving module 111 may be stored in a suitable device, such as a memory 170.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like).

Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like). In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images.

A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

The display unit 151 outputs information processed in the mobile terminal 100. For example, the display unit 151 may display information on an execution screen of an application program driven in the mobile terminal 100, or a User Interface (UI) or a Graphic User Interface (GUI) associated with such execution screen information.

The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

At least one antenna for wireless communication may be located on the terminal body. The antenna may be installed in the terminal body or formed by the case. For example, an antenna which configures a part of the broadcast receiving module 111 (refer to FIG. 1) may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

Figure 1B:
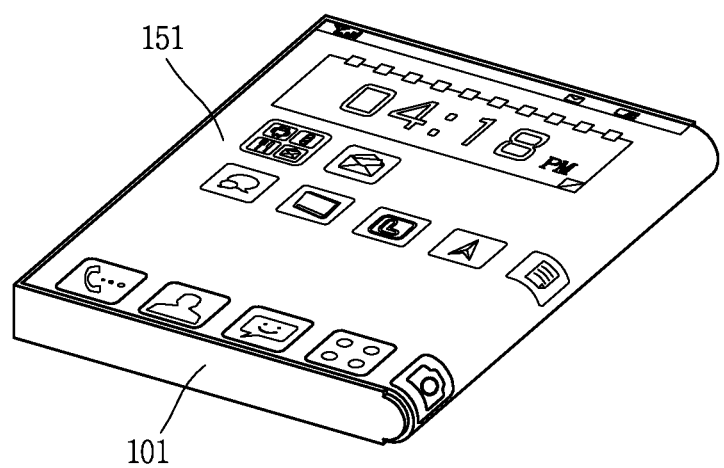
FIGS. 1B(a) and 1B(b) are conceptual views illustrating a mobile terminal including a flexible display unit.
Figure 1B:
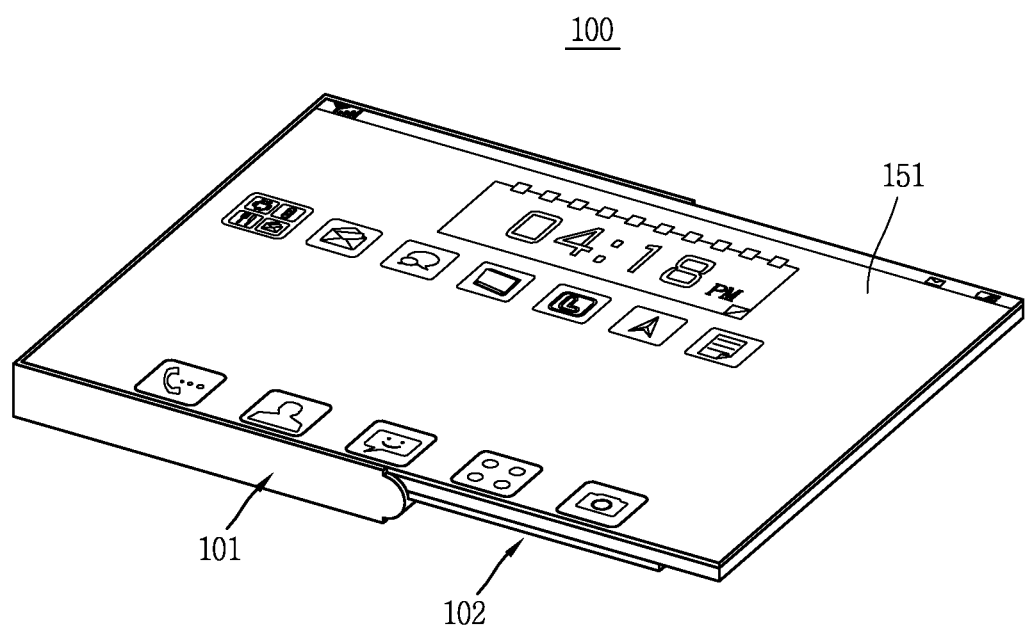

FIG. 1B is a conceptual view illustrating a mobile terminal including a flexible display unit. The mobile terminal according to an exemplary embodiment of the present disclosure includes a flexible display unit 151 that may be deformed by an external force applied thereto. The deformation may be at least one among bending, folding, twisting, and rolling of the display module. The deformable display module may be referred to as a "flexible display unit". Here, the flexible display unit 151 may include all of a general flexible display, e-paper, and a combination thereof.

A general flexible display refers to a display fabricated on a thin, flexible substrate which is pliable, bendable, foldable, twistable, or rollable, while maintaining characteristics of an existing flat panel display, which, thus, is light in weight and not brittle.

Also, e-paper refers to a display technique employing the characteristics of general ink. A difference of e-paler from an existing flat panel display lies in that e-paper uses reflected light. In e-paper, information may be changed by using twist balls or electrophoresis using capsules.

In a state in which the flexible display unit 151 is not deformed (for example, in a state in which the flexible display unit 151 has an infinite radius of curvature) (hereinafter, referred to as a "first state"), a display region of the flexible display unit 151 is flat. When the flexible display unit 151 is deformed by an external force in the first state (for example, a state in which the flexible display unit 151 has a finite radius of curvature, which will be referred to as a "second state, hereinafter), the display region may be curved.

As illustrated, information displayed in the second state may be visual information output on a curved surface. Such visual information is displayed as light emission of unit pixels (subpixels) disposed in a matrix form is independently controlled. A unit pixel refers to a minimum unit for implementing a single color.

The flexible display unit 151 may be changed from a first state, that is, in a flat state, to a bent state (for example, vertically or horizontally bent state). In this case, when an external force is applied to the flexible display unit 151, the flexible display unit 151 may be deformed to be flat state (or less bent state) or more bent state.

Meanwhile, the flexible display unit 151 may be combined with a touch sensor to implement a flexible touch screen. When a touch is applied to the flexible touch screen, the controller 180 (please refer to FIG. 1) may perform controlling corresponding to the touch input. The flexible touch screen may be configured to sense a touch input even in the second state, as well as in the first state.

Meanwhile, a deformation sensing unit for sensing deformation of the flexible display unit 151 may be provided in the mobile terminal 100 according to the present modified example. Such a deformation sensing unit may be included in the sensing unit 140 (please refer to FIG. 1).

The deformation sensing unit may be provided in the flexible display unit 151 or the body unit 101 or 102 to sense information related to deformation of the flexible display unit 151. Here, information related to deformation may include a direction in which the flexible display unit 151 is deformed, a degree to which the flexible display unit 151 is deformed, a deformed position of the flexible display unit 151, a period of time during which the flexible display unit 151 is deformed, acceleration at which the flexible display unit 151 in a deformed state is restored. In addition, the information related to deformation may be various types of information that can be sensed when the flexible display unit 151 is bent.

Also, on the basis of information related to deformation of the flexible display unit 151 sensed by the deformation sensing unit, the controller 180 may change information displayed on the flexible display unit 151 or may generate a control signal for controlling a function of the mobile terminal 100.

Deformation of a state of the flexible display unit 151 is not induced by only an external force. For example, when the flexible display unit 151 is in the first state, the flexible display unit 151 may be deformed to the second state by the user or by a command of an application.

The mobile terminal 100 according to an exemplary embodiment of the present disclosure is supported by the first and second body units 101 and 102, and the first and second body units 101 and 102 are rotatably connected. The first body unit 101 supports one region of the flexible display unit 151 and the second body unit 102 supports the other region of the flexible display unit 151. The first and second body units 101 and 102 relatively rotate at a certain angle in a mutually connected state, the region of the flexible display unit 151 connecting the first and second body unit 101 and 102 is bent, and the flexible display unit 151 turns to the second state in which portions thereof overlap with each other in the second state.

FIG. 1B(a) is a conceptual view illustrating the second state in which the flexible display unit 151 is folded, and FIG. 1B(b) is a conceptual view illustrating a first state in which the flexible display unit 151 is unfolded. In the drawings, only the first and second states are illustrated, but there may be another state in which one region and the other remaining region of the flexible display unit 151 are bent at a certain angle, while the flexible display unit 151 is deformed from the first state to the second state.

In the second state, the first and second body units 101 and 102 overlap with each other, and a space between the one region and the other remaining region are bent, forming a curved surface.

The first and second body units 101 and 102 include preset bezel portions formed to surround the edges of the flexible display unit 151, and the first and second body units 101 and 102 have preset thicknesses, respectively. A plurality of electronic components for driving the mobile terminal 100 are mounted in one region of at least one of the first and second body units 101 and 102.

Hereinafter, a specific structure in which the flexible display unit 151 is deformed in a state of being tightly attached to the body units, while the flexible display unit 151 is fixed to the body units having preset shapes and is changed from the first state to the second state or from the second state to the first state will be described.

Figure 2A:
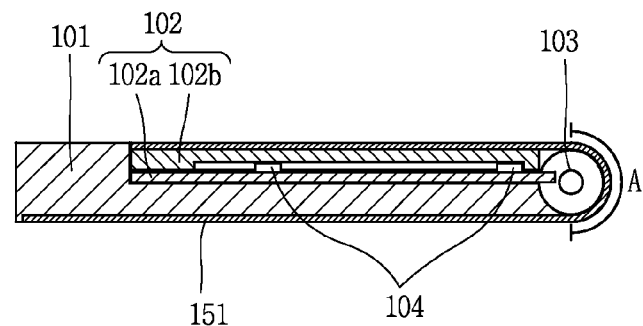
FIGS. 2A. 2B, 2C, 2D(a), 2D(b) and 2D(c) are cross-sectional views of FIG. 1B(a) illustrating a structure of a mobile terminal according to an exemplary embodiment of the present disclosure.

FIGS. 2A. 2B, 2C, 2D(a), 2D(b) through and 2D(c) are cross-sectional views of FIG. 1B(a) illustrating a structure of a mobile terminal according to an exemplary embodiment of the present disclosure. The mobile terminal 100 according to an exemplary embodiment of the present disclosure includes a flexible display unit 151, the first and second body units 101 and 102 supporting the flexible display unit 151, and a hinge unit 103.

The first and second body units 101 and 102 are rotatably connected by the hinge unit 103. The hinge unit 103 includes a hinge shaft (not shown), and connection portions formed to surround one region of the hinge shaft may be formed in one end portions of the first and second body units 101 and 102.

The flexible display unit 151 is attached on one surface of the first body unit 101. Although not shown in detail in the drawings, an adhesive member may be formed between the first body unit 101 and the flexible display unit 151. Also, a receiving portion may be formed to be recessed from one surface of the first body unit 101 to receive one region of the flexible display unit 151.

Figure 2B:
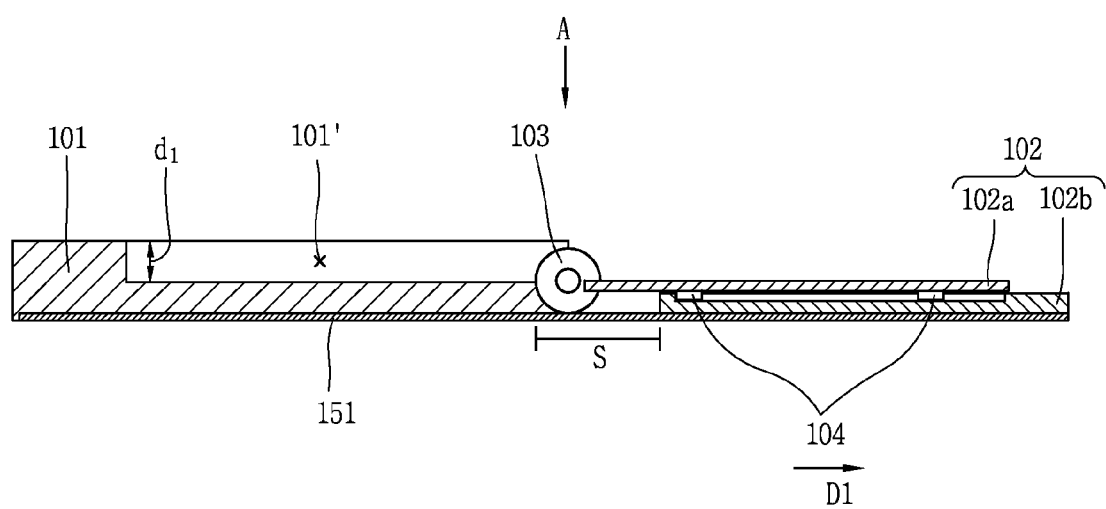

Also, the first body unit 101 includes a receiving space 101' formed to be recessed from the other surface opposing the one surface to receive the other remaining region of the flexible display unit 151. Referring to FIGS. 2A and 2B, the internal space 101' may have a depth d1 substantially equal to the thickness of the flexible display unit 151 and the second body 102. Referring to FIG. 2A, in the second state as a folded state, both the flexible display unit 151 and the second body unit 102 may be received in the internal space 101', and in the second state, the other surface of the first body unit 101 and the exposed outer surface of the display unit 151 may be maintained to be substantially flat.

The hinge unit 103 is fixed to the first body unit 101 on the flexible display unit 151, and one end portion of the first body unit 101 may be connected to the hinge portion 103. Here, preferably, one end portion of the first body unit 101 is connected to a lower portion, relative to the hinge shaft.

Meanwhile, one end portion of the second body 102 is connected to the hinge unit 103, and here, the one end portion of the second body unit 102 may be connected to a portion lower than the hinge shaft (not shown). The second body unit 102 includes first and second plates 102a and 102b which are formed to be slidable with each other.

The first plate 102a is connected to the hinge unit 103 so as to be relatively rotated from the first body unit 101 with respect to the hinge shaft. In order to allow the first and second body units 101 and 102 having preset thicknesses to completely overlap with each other, the first plate 102a may be connected to a portion lower than the position of the hinge shaft, the center of the hinge unit 103. The first plate 102a may further include a connection portion covering one region of the hinge unit 103.

One surface of the second plate 102b is installed to be slidably moved to the first plate 102a. In the second state, end portions of the first and second plates 102a and 102b overlap with each other to form a single end portion. Meanwhile, in the second state, one regions of the first and second plates 102a and 102b partially overlap with each other.

The other remaining region of the flexible display unit 151 is installed on the other surface of the second plate 102b. Although not illustrated in detail in the drawings, an adhesive member may be formed between the flexible display unit 151 and the other surface of the second plate 102b.

The flexible display unit 151 includes a region fixed to the body 101, a region fixed to the second unit 102, and an unattached region S. In the second state, the unattached region S is formed to cover a portion of an outer circumferential surface of the hinge unit 103, and in the first state, the unattached region S may be restricted from being in contact with other components and may form a space with the first plate 102a.

For a slidable movement of the first plate 102a and the second plate 102b, the second body unit 102 includes a movement guide unit 104. In a state in which the flexible display unit 151 is attached, the movement guide unit 104 guides the second plate 102b to reciprocate in a direction in which the display unit extends with respect to the first plate 102a, namely, in a first direction D1 on the drawing.

Figure 2C:
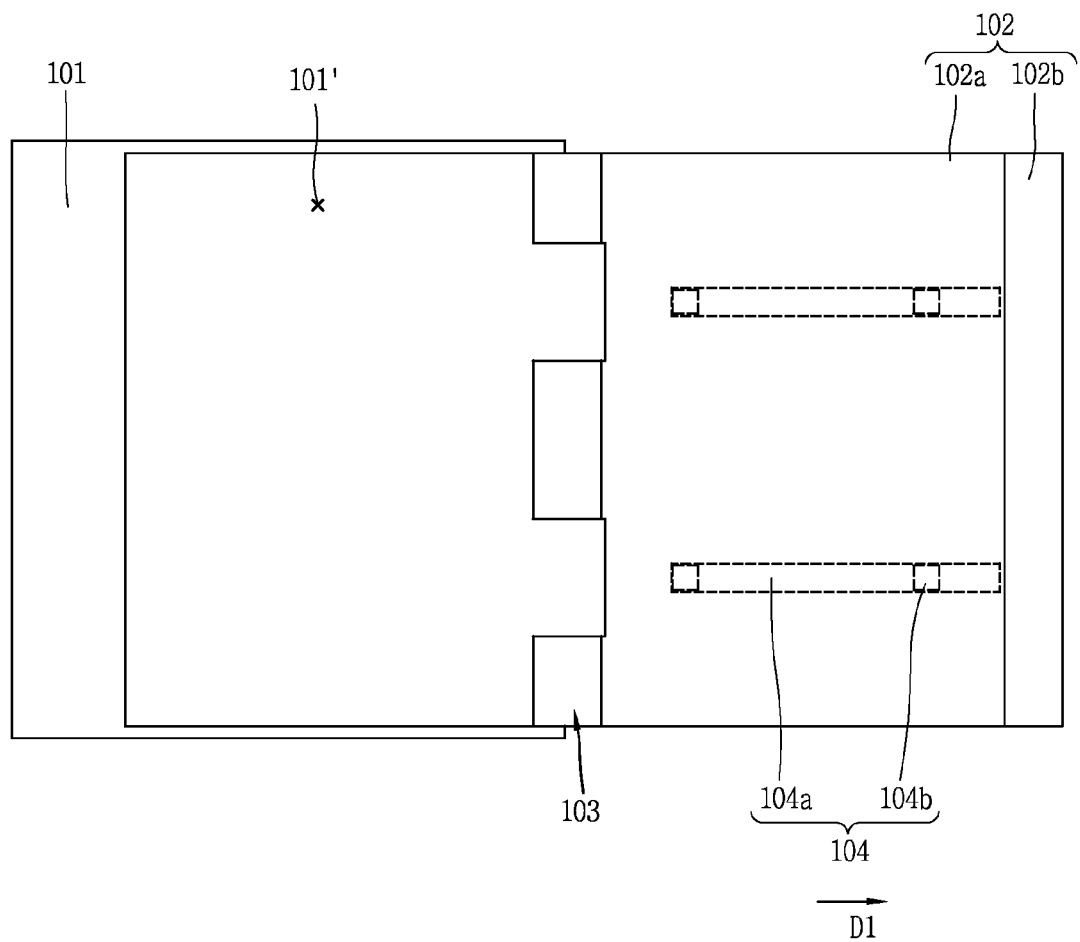

FIG. 2C is a conceptual view of FIG. 2B viewed in an A direction, illustrating a guide unit according to an exemplary embodiment of the present disclosure.

FIG. 2C is a conceptual view illustrating the mobile terminal in the first state. The first and second plates 102a and 120b are partially overlapped state, and the receiving space 101' is exposed.

Referring to FIGS. 2B and 2C, the guide unit includes a guide groove 104a and a guide protrusion 104b. The guide groove 104a extends in the first direction D1, and recessed from the other surface of the second plate 102b. The guide protrusion 104b is formed to be inserted into the guide groove 104b, and protrude from one surface of the first plate 102*a*. The guide protrusion 104*b* may have a cross-section having an I shape such that it may not be separated from the guide groove 104*a*. Accordingly, when an external force is applied by the user, the second plate 102*b* moves in a direction away from the first body unit 101, namely, in a direction away from the hinge unit 103, along the guide groove 104*a*, and thus, the unattached region S is under tensile force applied from the first and second body units 101 and 102 so as to be maintained to be flat in the first state. Hereinafter, a deformed state of the flexible display unit 151 according to the structure of the second body unit 102 will be described.

Figure 2D:
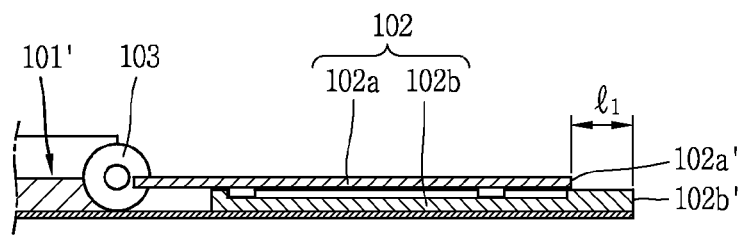
Figure 2D:
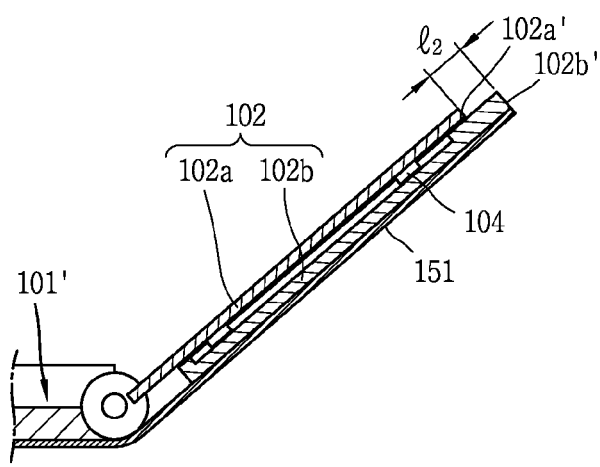
Figure 2D:
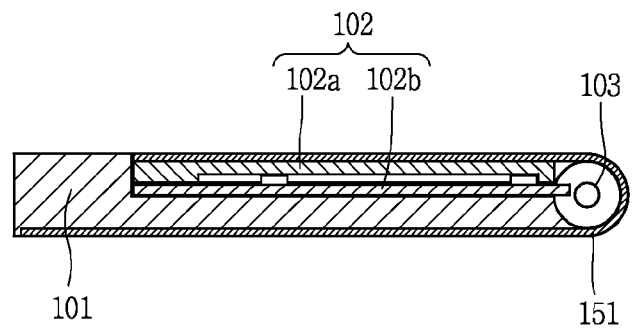

FIGS. 2D(a), 2D(b) and 2D(c) are conceptual views illustrating a movement of the structure of the mobile terminal according to an exemplary embodiment of the present disclosure.

FIG. 2D(a) is a partial cross-sectional view of the mobile terminal 100 in the first state, and 2D(c) is a partial cross-sectional view of the mobile terminal 100 in the second state, and FIG. 2D(b) is a view illustrating an intermediate state in deformation from the first state to the second state (or vice versa).

a length between a first end portion 102*a*' of the first plate 102*a* and a second end portion 102*b*' of the second plate 102*b* in the first state will be defined as a first length l1. Referring to FIGS. 2D and 2B, the first length l1 is formed to be smaller than or substantially equal to the unattached region S.

FIG. 2D(b) illustrates a state in which the second body unit 102 relatively rotates with respect to the first body unit 101 such that the first body unit 101 and the first plate 102*a* are at a particular angle. In this case, a length between the first and second end portions 102*a*' and 102*b*' is a second length l2, and the second length l2 is smaller than the first length l1. Also, a portion of the unattached region S covers a portion of an outer circumferential surface of the hinge unit 103.

Referring to FIG. 2D(c), in the second state, the first and second body units 101 and 102 are received in the receiving region 101'. That is, the sequentially overlapped first and second body units 101 and 102 and the other region of the flexible display unit 151 are received in the receiving region 101'. The flexible display unit 151 and an outer surface of the first body unit 101 may form a plane. In this case, the length between the first and second end portions 102' and 102*b*' substantially disappear and the first and second end portions 102*a*' and 102*b*' may form the substantially same end portions.

In the second state, the flexible display unit 151 may be formed to cover a half of an outer circumference of the hinge unit 151. That is, the first length l1 may be formed to be substantially equal to the length corresponding to the half of the outer circumference of the hinge unit.

Thus, in the mobile terminal 100 having the flexible display unit 151 formed to be bent and folded with respect to the hinge unit formed to have a preset diameter, the flexible display unit 151 may be maintained in an overall flat state in the unfolded state by the first and second plates 102*a* and 102*b* that can be relatively movable by one region of the flexible display unit 151 covering the hinge unit in the folded state.

Thus, although the flexible display unit 151 is repeatedly deformed, namely, repeatedly folded and unfolded, damage to the folded region of the flexible display unit 151 can be minimized. Also, image output quality in the folded region can be enhanced.

Figure 3A:
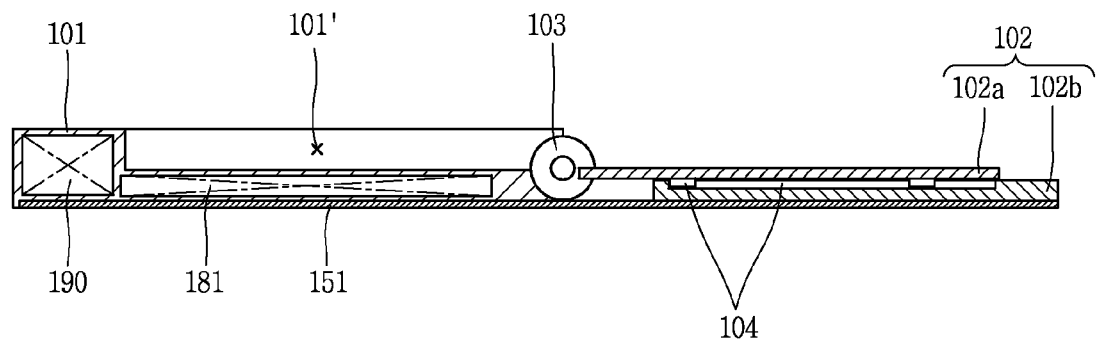
FIGS. 3A, 3B(a), and 3B(b) are cross-sectional views illustrating a space for mounting an electronic component according to an exemplary embodiment of the present disclosure.
Figure 3B:
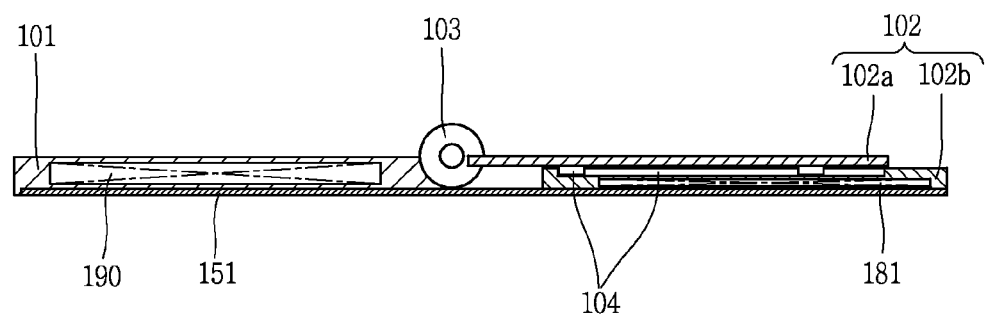
Figure 3B:
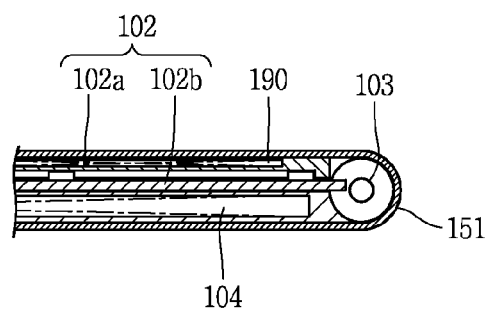

Electronic components for driving the mobile terminal 100 may be mounted on at least a portion of the first and second body units 101 and 102 of the mobile terminal 100. FIGS. 3A, 3B(a), and 3B(b) are cross-sectional views illustrating a space for mounting an electronic component according to an exemplary embodiment of the present disclosure.

Referring to FIGS. 2B and 3A, the first body unit 101 includes the receiving space 101' having the first thickness d1 to receive the second body unit 102 and the flexible display unit 151 in the second state. Also, a first mounting space allowing the electronic component to be mounted therein is provided in the other end portion of the first body unit 101 having one end portion connected to the hinge unit 103. The receiving space 101' may be formed by a length over which the flexible display unit 151 extends, the thickness d1 of the receiving space 101', and a radius from the center of the hinge unit 103.

For example, a power supply unit 190 may be mounted in the first mounting space. The first mounting space is a region having a relatively large thickness, and thus, a battery having increased capacity, and the like, may be mounted in the first mounting space. That is, the first mounting space is disposed to be adjacent to the second body unit 102 in the second state.

Also, the first body unit 101 has a thickness formed between the one surface of the first body unit 101 on which the flexible display unit 151 is attached and the receiving space 101' by the radius of the hinge unit 103. Accordingly, a circuit board 181, or the like, forming an electrical signal according to an electronic component may be mounted in a second mounting space formed due to the preset thickness of the first body unit 101.

The second mounting space may have an area substantially the same as that of one region in which the flexible display unit 151 is attached to the first body unit 101. However, the electronic components mounted in the first and second mounting regions are not limited thereto and shapes and relative sizes of the first and second mounting spaces are not limited to those illustrated in the drawings.

A mounting space of an electronic component according to another exemplary embodiment of the present disclosure will be described with reference to FIGS. 3B(a) and 3B(b). The first body unit 101 of the mobile terminal 100 according to the present exemplary embodiment does not form the receiving space 101' of FIG. 3A. Referring to FIG. 3B(b), the second body unit 102 attached to the flexible display unit 151 in the second state is formed to overlap on the first body unit 101. FIG. 3B(a) is a cross-sectional view of the mobile terminal 100 in the first state, and FIG. 3B(b) is a cross-sectional view of the mobile terminal 100 in the second state.

Referring to FIG. 3B(a), in the first state, the first and second body units 101 and 102 are formed to have the substantially same thickness with respect to the flexible display unit 151.

In this case, the electronic component may be mounted by using thicknesses of the first and second body units 101 and 102. For example, the power supply unit 190 formed to be wide and thin may be mounted in the first mounting space of the first body unit, and the circuit board 181 my be disposed in the second mounting region of the second body unit 102.

In the mobile terminal 100 according to the present disclosure, the first and second body units 101 and 102 extend to correspond to the area of the flexible display unit 151, and thus, a wider and thinner mounting space may be provided. Also, since the mounting space is formed in both the first and second body units 101 and 102, the first and second body units 101 and 102 may be formed to be balanced in weight.

The flexible display unit 151 is provided with tensile force so as to be deformed to be flat according to the second plate 102*b* moved by an external force from the user. Hereinafter, an additional structure providing tensile force to the flexible display unit will be described in detail.

The mobile terminal 100 including an elastic member according to an exemplary embodiment of the present disclosure will be described with reference to FIGS. 2D(a), 2D(b), 2D(c), 4A(a) and 4A(b). The mobile terminal 100 according to the present exemplary embodiment includes a side wall portion 102*c* formed to surround the edges of the first and second plates 102*a* and 120*b* and the edges of the flexible display unit 151. the side wall portion 102*c* may be formed to be substantially equal to a total thickness of the flexible display unit 151 and the first and second plates 102*a* and 120*b*. That is, in the first state, a space having a first length l1 is formed between a first end portion 102*a*' of the first plate 102*a* and the side wall portion 102*c*. Also, the side wall portion 102*c* is fixed to a second end portion 102*b*'.

The mobile terminal 100 according to the present exemplary embodiment further includes first elastic members 170*a* formed in the space to elastically support the side wall portion 102*c* and the first plate 102*a*. The side wall portion 102*c* and the first plate 102*a* are forced to become away from one another due to elastic force of the first elastic members 107*a*, and accordingly, the second plate 102*b* and the first plate 102*a* fixed to the side wall portion 102*c* are under tensile force exerted to make the second plate 102*b* and the first plate 102*a* become away. Also, the side wall portion 102*c* has a first recess 102*c*' having a preset depth such that the first elastic members 170*a* are received therein.

That is, in the first state, tensile force may be applied to the unattached region S of the flexible display unit 151 due to elastic force provided between the first and second plates 102*a* and 120*b* in the first state.

Figure 4A:
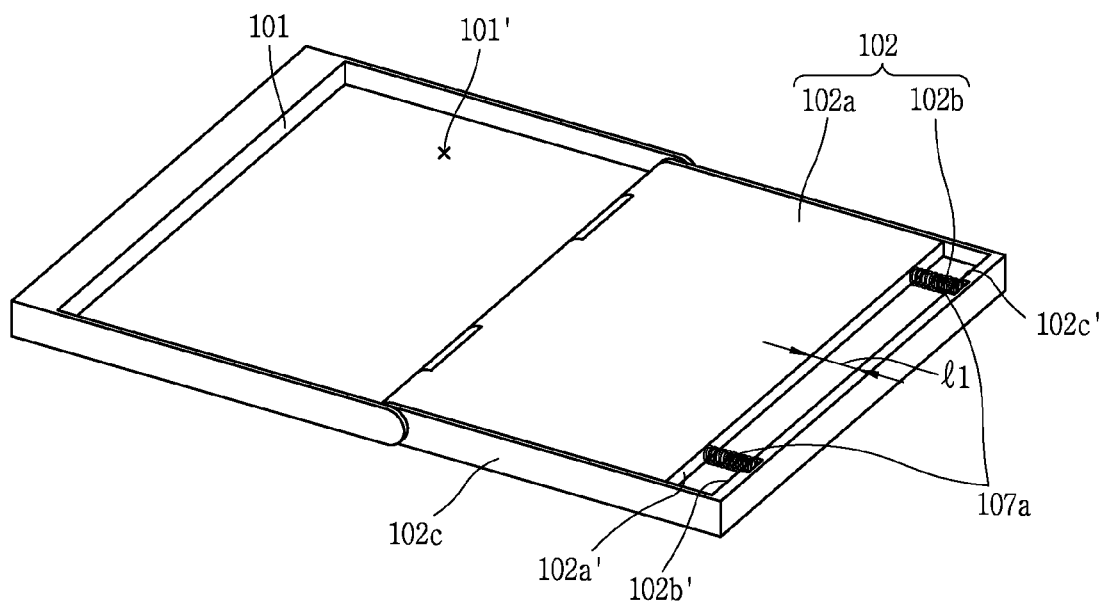
FIGS. 4A(a), 4A(b), 4B, 4C and 4D are conceptual views specifically illustrating an additional structure providing tensile force to a flexible display unit in a second state.
Figure 4A:
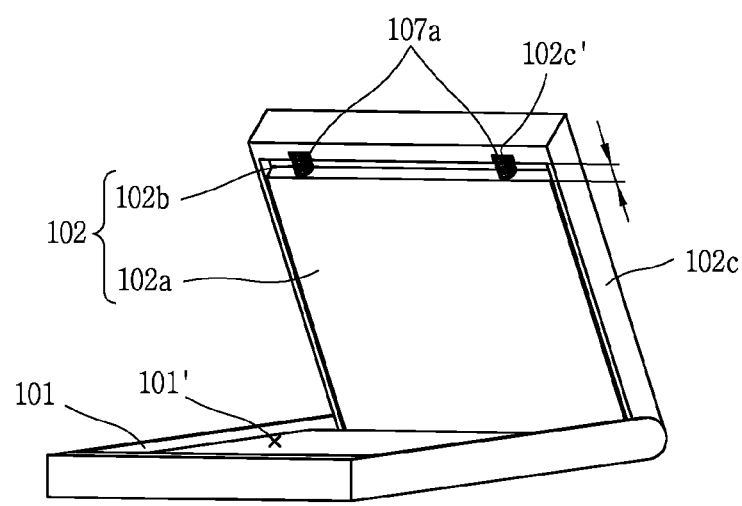

Referring to FIG. 4A(b), the first elastic member 107*a* may be deformed by external force of the user applied while the mobile terminal is deformed to the second state. Although not shown in detail in the drawings, when the mobile terminal is changed to the second state, the first electric members 107*a* may be received in the first recess 102*c*'.

According to the present exemplary embodiment, since elastic force is provided between the first and second plates 102*a* and 120*b* to provide the second plate 102*a* with a force to make it move, the unattached region S of the flexible display unit 151 may be formed to be more flat.

Figure 4B:
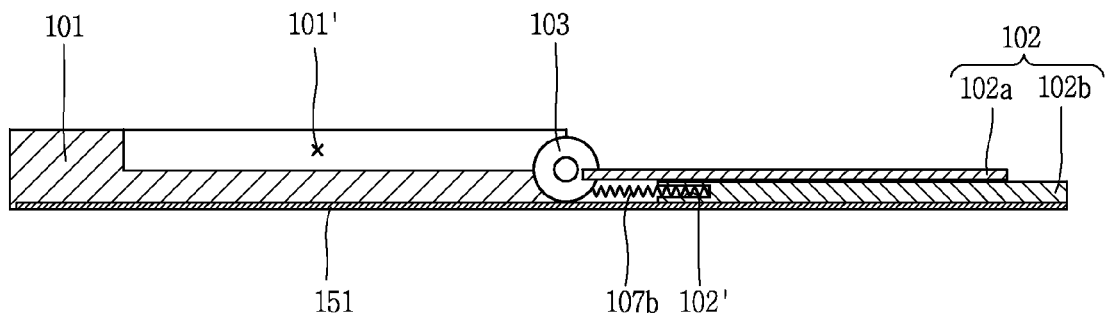

The mobile terminal 100 including a second elastic member formed in the second body unit will be described with reference to FIG. 4B. The second plate 102*b* includes a second recess 102' recessed from the other end portion of the second plate 102*b*, namely, from an end portion facing the hinge unit 103 in the first state. Also, the second body unit 102 includes a second elastic member 107*b* having a portion received in the second recess 102' and supporting the second plate 102*b* and the hinge unit 103.

A force thrusting the second plate 102*b* from the hinge unit 103 is provided in the first state due to elastic force of the second elastic member 107*b*. Accordingly, the second plate 102*b* may move farther by virtue of the elastic force and the unattached region S may become more flat.

Figure 4C:
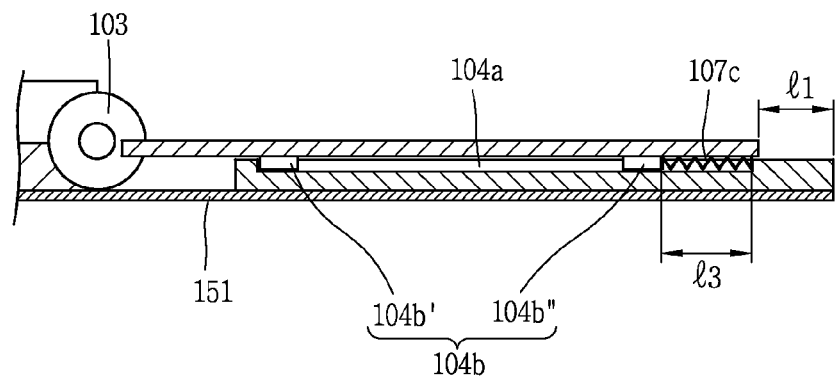
Figure 4C:
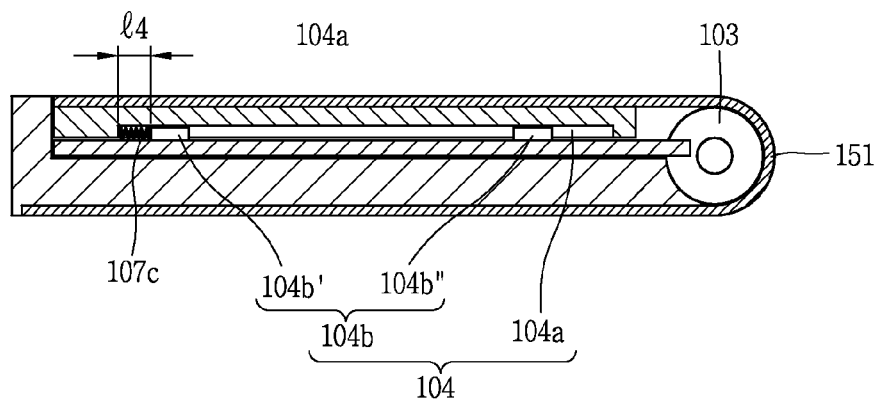

The mobile terminal 100 having a third elastic member 107*c* received in the guide unit will be described with reference to FIGS. 2C and 4C.

The mobile terminal 100 according to the present exemplary embodiment may include a plurality of guide protrusions 104*b*. For example, the guide unit 104 may include a first guide protrusion 104*b*' disposed to be most adjacent to the hinge unit 103 and a second guide protrusion 104*b*'' disposed to be farthest from the hinge unit 103. The guide groove 104*a* is formed such that a distance over which the first and second guide protrusions 104*b*' and 104*b*'' move when the mobile terminal 100 is changed from the second state to the first state is substantially equal to the first length l1.

The third elastic member 107*c* according to the present exemplary embodiment is received in the guide groove 104*a* and elastically supports the second guide protrusion 104*b*'' and an inner surface forming the guide groove 104*a* of the second plate 102*b*.

A third length l3 between the second guide protrusion 104*b*'' and an inner surface of the second plate 102*b* forming the guide groove 104*a* in the first state is greater than the first length l1. Also, the third elastic member 107*c* contracts in the second state, and a fourth length l4 of a space formed to receive the third elastic member 107*c* between the second guide protrusion 104*b*'' and an inner surface of the second plate 102*b* is smaller than the first length l1.

Preferably, third elastic members 107*c* may be formed to correspond to the number of guide units. The third elastic member 107*c* is not exposed to the outside of the mobile terminal 100, a simple appearance can be provided.

Figure 4D:
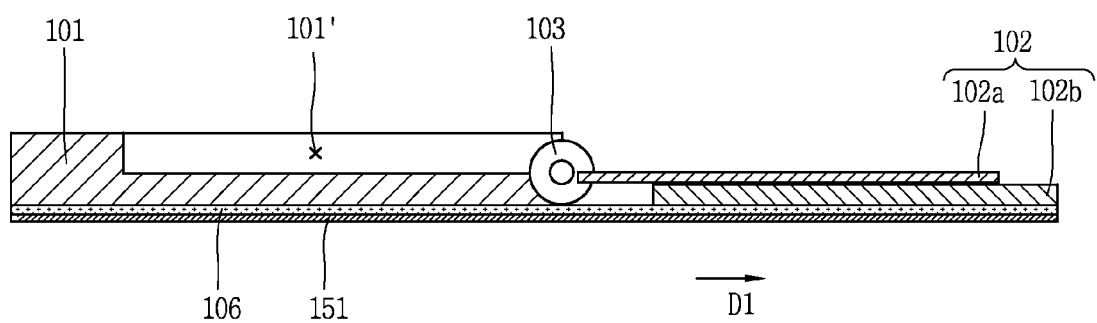

The structure of the mobile terminal 100 including a deformation guide member will be described with reference to FIG. 4D. The mobile terminal according to the present exemplary embodiment may further include a deformation guide member 106 attached to the flexible display unit 151. The deformation guide member 106 may be formed of a material deformed by itself such that the flexible display unit 151 becomes flat when the mobile terminal 100 is changed to the first state.

For example, the deformation guide member 106 may be formed of an elastic member having elastic force for becoming flat, or may be formed as a bending sensor that may be changeable to a desired shape and as a shape memory member having a force to be deformed to a preset shape by an electric signal.

The deformation guide member 106 may be formed in one region or in the entire region of the flexible display unit 151. Preferably, the deformation guide member 106 may be formed in the unattached region S and formed to extend in a first direction D1.

According to the present exemplary embodiment, since the deformation guide member 106 is directly installed on the flexible display unit 151, without any additional structure installed in each component to provide tensile force, durability can be enhanced.

Figure 5A:
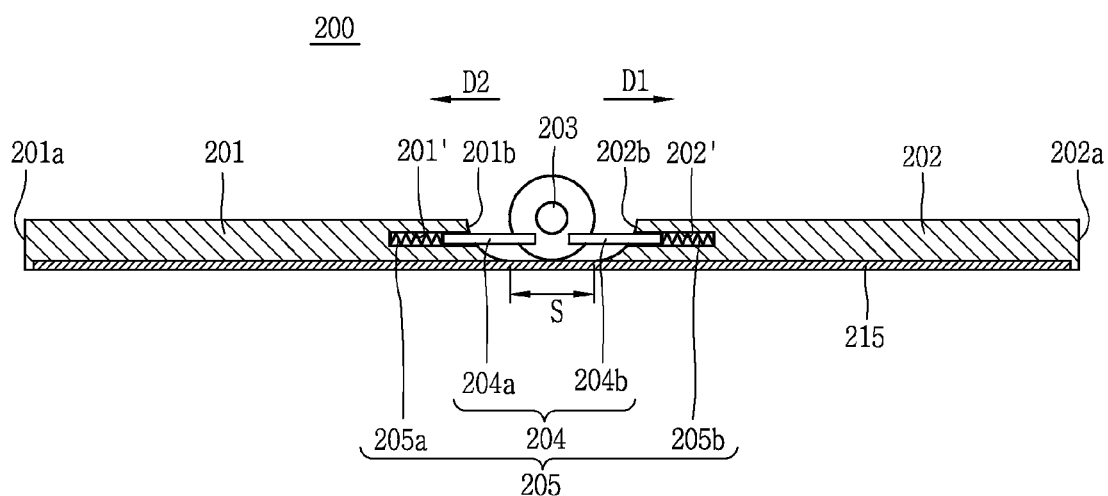
FIGS. 5A and 5B are cross-sectional views illustrating a structure of a mobile terminal according to another exemplary embodiment of the present disclosure.
Figure 5B:
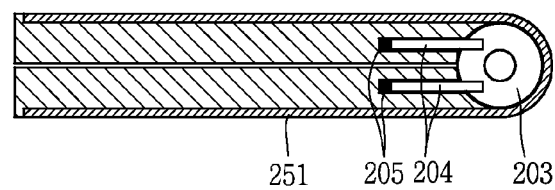

FIGS. 5A and 5B are cross-sectional views illustrating a structure of a mobile terminal according to another exemplary embodiment of the present disclosure. FIG. 5A is a cross-sectional view illustrating a mobile terminal in the first state according to the present exemplary embodiment, and FIG. 5B is a cross-sectional view illustrating a mobile terminal in the second state according to the present exemplary embodiment.

A mobile terminal 200 according to an exemplary embodiment of the present disclosure includes a flexible display unit 251, first and second body units 201 and 202 supporting the flexible display unit 251, and a hinge unit 203 connecting the first and second body units 201 and 202 such that the first and second body units 201 and 202 relatively rotate with each other. The flexible display unit 251 is substantially identical to the flexible display unit 151 of FIG. 2A, and redundant descriptions thereof will be omitted.

The mobile terminal 200 includes connection units 204 and elastic units 205 in order to connect the first and second body units 201 and 202 to the hinge unit 203. The first and second body units 201 and 202 include first and second insertion recesses 201' and 202', respectively. The first and second insertion recesses 201' and 202' are formed to face each other in the first state.

The connection units 204 include first and second connection members 204a and 204b inserted into the first and second insertion recesses 201' and 202', respectively. Also, the elastic units 205 include first and second elastic members 205a and 205b formed to elastically support the first and second connection members 204a and 204b in the first and second body units 201 and 202, respectively. With respect to the hinge unit 203, the second elastic member 205b pushes the second body 202 in the first direction D1. Conversely, the first elastic member 205a provides a force pushing the first plate 201 in a direction opposite the first direction D1 with respect to the hinge unit 203. Accordingly, the first and second bodies 201 and 202 are forced to move in the mutually opposite directions with respect to the hinge unit 203.

The lengths of the first and second body units 201 and 202 are substantially equal to support the flexible unit 151 in the substantially same region, but the present disclosure is not limited thereto.

Also, the flexible display unit 251 is partially fixed to the first and second body units 201 and 202 and may further include an adhesive member (not shown) to attach the flexible display unit 251 to the first and second body units 201 and 202. Also, the flexible display unit 251 may include an unattached region S not fixed by the first and second body units 201 and 202. Referring to FIG. 5B, the unattached region S may be formed to cover a portion of an outer circumferential surface of the hinge unit 203 in the second state.

The first and second bodies 201 and 202 are forced to move in the mutually opposite directions by the elastic units in the first state, tensile force is provided to the unattached region S. Accordingly, the unattached region S may be maintained to be flat even though it is not supported by the body units.

Meanwhile, the first body 201 includes a first end portion 201a and a second end portion 201b, and the second body 202 includes a first end portion 202a and a second end portion 202b. The second end portion 201b of the first body 201 and the second end portion 202b of the second body 202 are formed to face each other in the first state.

The second end portions 201b and 202b of the first and second body units 201 and 202 are formed as curved surfaces corresponding to the outer circumferential surfaces of the hinge unit 203. That is, in the second state, the second end portions 201b and 202b of the first and second body units 201 and 202 are formed to surround the outer circumferential surface of the hinge unit 203. In other words, in the second state, the outer circumferential surface of the hinge unit 203 may be covered by the second end portions 201b and 202b of the first and second body units 201 and 202 and the unattached region S of the flexible display unit 251.

Referring to FIG. 5B, when the lengths of the first and second body units 201 and 202 are substantially equal, the first end portions 201a and 202a of the first and second body units 201 and 202 may be form a single end portion in the second state. That is, the first end portions 201a and 202a may be formed to be substantially flat.

In the second state, the elastic units 205 may be received in a contracted state within the first and second insertion recesses 201' and 202'. According to the present exemplary embodiment, the mobile terminal 200 may be forced to be changed to the first state on the basis of the elastic units 205.

Also, since the connection units and the elastic units connecting the first and second body units 201 and 202 are partially received within the first and second body units 201 and 202, components forming the mobile terminal 200 can be minimized, and thus, the compact mobile terminal can be provided.

Figure 6A:
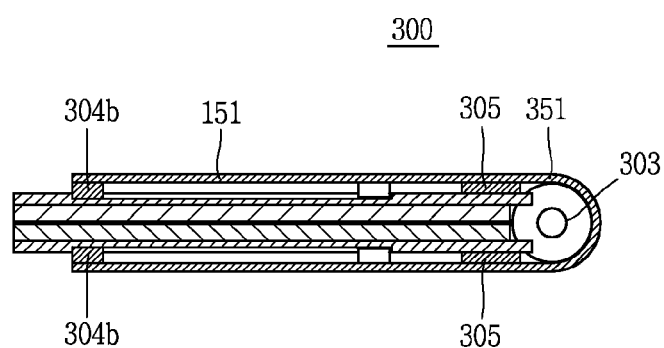
FIGS. 6A and 6B are cross-sectional views illustrating a structure of a mobile terminal according to another exemplary embodiment of the present disclosure.
Figure 6B:
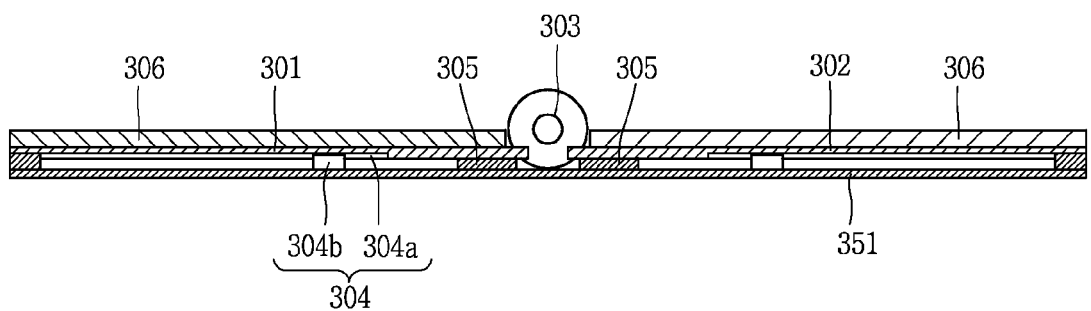

FIGS. 6A and 6B are cross-sectional views illustrating a structure of a mobile terminal according to another exemplary embodiment of the present disclosure. FIG. 6A is a cross-sectional view illustrating a mobile terminal in the first state according to the present exemplary embodiment, and FIG. 6B is a cross-sectional view illustrating a mobile terminal in the second state according to the present exemplary embodiment The mobile terminal 300 according to the present exemplary embodiment includes a flexible display unit 351, first and second body units 301 and 302 supporting the flexible display unit 351, a hinge unit 303 connecting the first and second body units 301 and 302 such that the first and second body units 301 and 302 are relatively rotatable with each other, and guide units 304. The flexible display unit 351 is substantially the same as the flexible display unit 251 of FIG. 5B, and redundant descriptions thereof will be omitted.

The first and second body units 301 and 302 of the mobile terminal 300 according to the present exemplary embodiment are connected to the hinge unit 301. Also, the first and second body units 301 include a guide groove 304a having a preset length. Also, the flexible display unit 351 further includes a guide protrusion 304b protruding from one surface and inserted into the guide groove 304a. the flexible display unit 351 may include a plurality of guide protrusions 304b, and in order to prevent the flexible display unit 351 from being separated from the first and second body units 301 and 302, the at least one pair of guide protrusions 304b may be formed to be adjacent to edges of the flexible display unit 351.

The flexible display unit 351 according to the present exemplary embodiment may correspond to an OLED-type display unit.

The mobile terminal 300 includes a pair of third body units 306 formed on the first and second body units 301 and 302. The third body unit 306 includes an internal space allowing an electronic component required for driving the mobile terminal 300 to be installed therein. Also, as illustrated in FIG. 6B, the third body units 306 are formed such that one surfaces thereof are in contact with the first and second body units 301 and 302 in the second state. That is, a thickness of the third body unit 306 may be determined by a diameter of the hinge unit 303.

In the first state, end portions of the flexible display unit 351 and end portions of the first and second body units 301 and 302 are aligned, while, in the second state, a distance is formed between the end portions of the flexible display unit 151 and the end portions of the first and second body units 301 and 302.

A spacer 305 may be formed between the flexible display unit 351 and the first and second body units 301 and 302 where the guide unit is not formed. The spacer 305 supports the flexible display unit 351 and the first and second body units to maintain a gap therebetween.

When the mobile terminal is deformed from the first state to the second state, the end portions of the first and second body units 301 and 302 protrude longer than the flexible display unit 351.

According to the present exemplary embodiment, since the guide protrusion is directly formed on the flexible display unit, the structure is simplified, and even though the mobile terminal is repeatedly deformed, a problem in which the flexible display unit is separated from the body units can be minimized, and thus, durability of the mobile terminal can be enhanced.

Figure 7A:
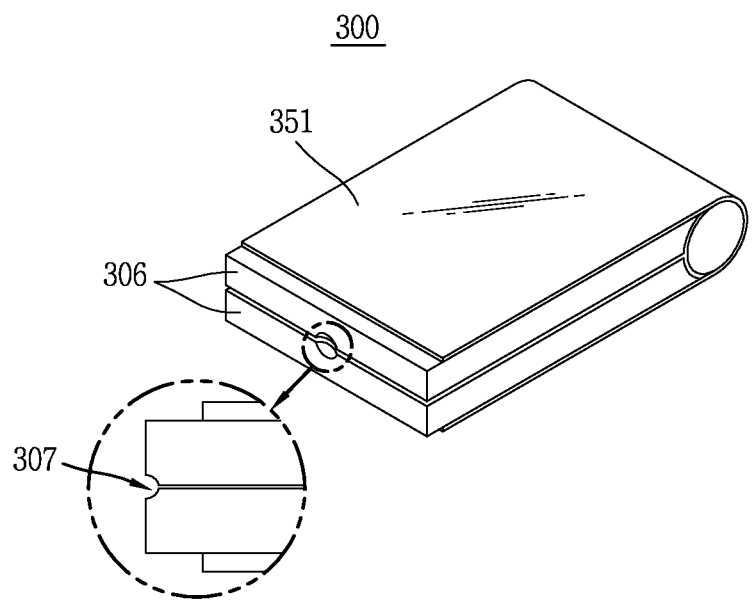
FIGS. 7A and 7B are views illustrating a structure for moving or fixing body units in the second state.
Figure 7B:
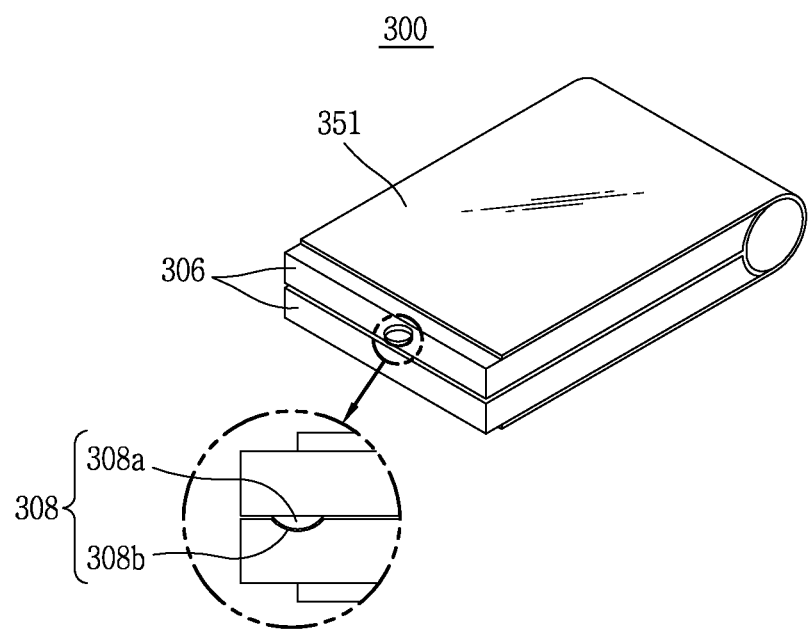

FIGS. 7A and 7B are views illustrating a structure for moving or fixing the body units in the second state.

A structure for separating a pair of body units in the second state will be described with reference to FIG. 7A. A pair of third body units 306 of the mobile terminal 300 includes a recess 307 formed as portions of facing regions of the pair of third body units 306 are recessed.

The user may put his or her finger into the recess 307 to separate the pair of third body units 306.

A structure for fixing a pair of body units in the second state will be described with reference to FIG. 7B. The pair of third body units of the mobile terminal 300 may include first and second magnet units 308*a* and 308*b* having different poles.

The first magnet unit 308*a* may have a protrusion shape and the second magnet unit 308*b* may have a recess shape corresponding to the first magnet unit 308*a*. The first and second magnet units 308*a* and 308*b*, having different poles, may provide a force enabling the first and second body units 301 and 302 to be maintained in the second state by attraction.

Figure 8A:
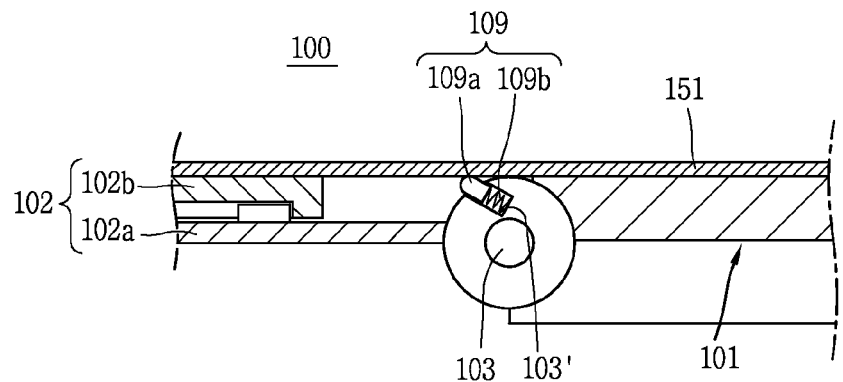
FIGS. 8(a), 8(b) and 8(c) are views illustrating a structure of a mobile terminal that can be deformed to a third state according to another exemplary embodiment of the present disclosure.
Figure 8B:
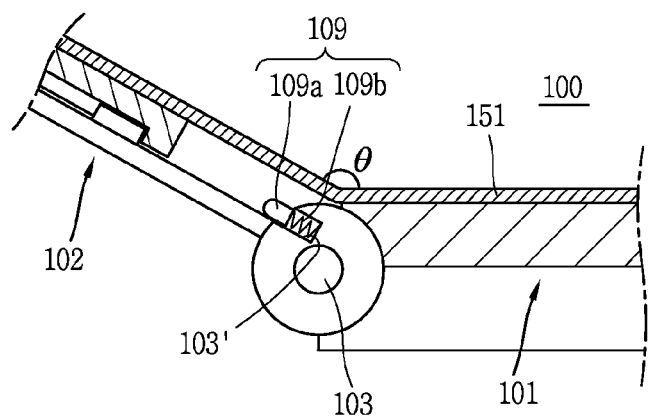
Figure 8C:
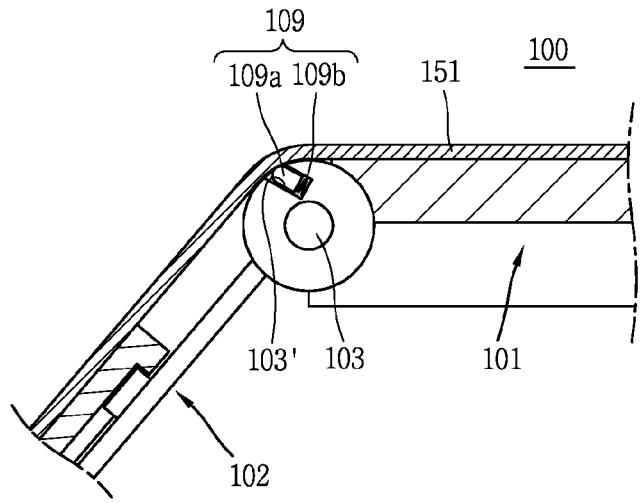

FIGS. 8(*a*), 8(*b*) and 8(*c*) are a views illustrating a structure of a mobile terminal that can be deformed to a third state according to another exemplary embodiment of the present disclosure. The mobile terminal 100 implemented in the third state in which the flexible display unit 151 is bent at a preset angle (θ).

Referring to FIGS. 2A, 8(*a*), 8(*b*) and 8(*c*), the mobile terminal 100 according to the present exemplary embodiment includes a stopper module 109 installed in the hinge unit 103. the hinge unit 103 includes a recess portion 103' formed in a preset region, and the stopper module 109 includes a stopper 109*a* supporting the second body unit 102 and an elastic unit 109*b* received in the recess portion 103' and elastically supporting the stopper 109*a*.

Referring to FIGS. 8(*a*) and 8(*b*), when the mobile terminal is changed from the first state to the third state, the stopper module 109 protrudes between the flexible display unit 151 and the first plate 102*a*. Referring to FIGS. 8(*a*) and 8(*b*), in the first state and the second state, the stopper 109*a* is pressed by the flexible display unit 151 and the stopper 109*a* is received in the recess portion 103'.

While the flexible display unit 151 is being changed to the third state, a space is formed between the flexible display unit 151 and the first plate 102, and the stopper 109*a* is projected by the elastic unit 109*b*. Meanwhile, since the stopper 109*a* supports the first plate 102*a* in the third state, a further movement of the first plate 102*b* is blocked.

In the third state, the stopper 109*b* is substantially parallel to the second plate 102*b*. Accordingly, the user may use the mobile terminal in a state in which the flexible display unit 151 is bent at the present angle (θ).

Also, since the flexible display unit 151 is prevented from being bent by the stopper module, damage to the flexible display unit 151 can be prevented.

The configuration and method of the mobile terminal according to the embodiments of the present disclosure described above are not limited in its application, but the entirety or a portion of the embodiments may be selectively combined to be configured into various modifications.

The foregoing embodiments and advantages are merely exemplary and are not to be considered as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds are therefore intended to be embraced by the appended claims.

What is claimed is:

1. A mobile terminal comprising:
    a flexible display configured to be deformed by changing the display from an unfolded state to a folded state;
    a first body configured to support a first region of the display;
    a second body configured to support a remaining region of the display; and
    a hinge rotatably coupling the first body with the second body, wherein movement of the first body relative to the second body about the hinge permits the display to be changed between the unfolded state to the folded state,
    wherein the second body comprises:
    a first plate coupled to the hinge; and
    a second plate slidably coupled to the first plate to permit the second plate to be moved in a direction that extends from the hinge to permit the display to be changed to the unfolded state and to be moved in a direction that is towards the hinge to permit the display to be changed to the folded state, and
    wherein the first body is shaped to include a receiving space formed to be recessed on one side of the first body, wherein the receiving space is sized to receive the second body and the remaining region of the display when the display is in the folded state.

2. The mobile terminal of claim 1, wherein, in the unfolded state, one end portion of the first plate and one end portion of the second plate are spaced apart from one another by a first length, and
    while the display is being changed from the unfolded state to the folded state, length between the one end portion of the first plate and the one end portion of the second plate is reduced relative to the first length.

3. The mobile terminal of claim 2, wherein when the display is changed from the unfolded state to the folded state, the first and second plates move relative to each another such that the one end portion of the first plate and the one end portion of the second plate lie in a same plane.

4. The mobile terminal of claim 2, wherein the first length is smaller than or equal to a half of a length of an outer circumference of the hinge.

5. The mobile terminal of claim 2, further comprising:
a guide unit configured to guide the second plate to move in one direction while the display is changed from the unfolded state to the folded state,
wherein the guide unit comprises:
a guide groove formed on the first plate and extending in one direction; and
a guide protrusion located in the guide groove and protruding from the second plate.

6. The mobile terminal of claim 1, wherein the first body includes a mounting space allowing at least one electronic component to be installed therein.

7. The mobile terminal of claim 6, wherein the first body is formed to be longer than the second body, and, in the mounting space, the first body is disposed to be adjacent to the second body unit in the folded state.

8. The mobile terminal of claim 2, further comprising:
an elastic unit configured to provide elastic force to the second plate in the folded state.

9. The mobile terminal of claim 8, further comprising:
a side wall portion formed to surround edges of the second body and edges of the display in the folded state,
wherein the elastic unit elastically supports the side wall portion and one end portion of the first plate.

10. The mobile terminal of claim 8, wherein one region of the elastic unit is installed in a recess formed on the second plate, and the elastic unit elastically supports the second plate and the hinge.

11. The mobile terminal of claim 2, further comprising:
a deformation guide member attached to one surface of the display to provide an external force to enable the display to lie flat in the unfolded state.

12. The mobile terminal of claim 1, further comprising:
connection units connecting the hinge and the first and second bodies; and
elastic units provided to elastically support the connection units and the first and second bodies.

13. The mobile terminal of claim 12, wherein facing end portions of the first and second bodies are formed as curved surfaces to cover a portion of an outer circumferential surface of the hinge in the folded state.

14. The mobile terminal of claim 1, wherein the display includes guide protrusions protruding from one surface of the display; and wherein
the first and second bodies include guide grooves allowing the guide protrusions to be inserted therein and extending in the one direction.

15. The mobile terminal of claim 14, wherein a distance is formed between end portions of the first and second bodies and an end portion of the display in the folded state.

16. The mobile terminal of claim 14, further comprising:
a pair of third bodies formed to have a thickness such that the pair of third body units are in contact with each other in the folded state, and formed on other surfaces of the first and second bodies.

17. The mobile terminal of claim 16, wherein further comprising:
at least one recess formed on end portions of the pair of third bodies; and
magnetic units providing attraction to the pair of third bodies.

18. The mobile terminal of claim 1, further comprising:
a stopper protruding from one region of the hinge to support the second body and to limit relative rotation of the first and second bodies beyond a certain angle.

* * * * *